United States Patent [19]

Mochizuki

[11] Patent Number: 4,966,031

[45] Date of Patent: Oct. 30, 1990

[54] VIBRATION SENSOR

[75] Inventor: Kazuo Mochizuki, Tokyo, Japan

[73] Assignee: TDK Corporation, Tokyo, Japan

[21] Appl. No.: 294,073

[22] Filed: Jan. 6, 1989

[30] Foreign Application Priority Data

Jan. 11, 1988 [JP] Japan .................................. 63-1800

[51] Int. Cl.⁵ ............................................ G01L 23/22
[52] U.S. Cl. ...................................... 73/35; 310/329
[58] Field of Search ...................... 73/35, 654; 310/329

[56] References Cited

U.S. PATENT DOCUMENTS

| 3,307,054 | 2/1967 | Shoor ..................................... 310/8.4 |
| 4,383,194 | 5/1983 | Ohigashi et al. ..................... 310/327 |
| 4,393,688 | 7/1983 | Johnston et al. ........................ 73/15 |
| 4,399,705 | 8/1983 | Weiger et al. ............................ 73/35 |

FOREIGN PATENT DOCUMENTS 184666  6/1986  European Pat. Off. ................. 73/35

Primary Examiner—John Chapman
Attorney, Agent, or Firm—Armstrong, Nikaido, Marmelstein, Kubovcik & Murray

[57] ABSTRACT

In a vibration sensor including a base member shaped in the form of a sleeve having a structure for installation on an object of measurement, a piezoelectric conversion portion put onto the periphery of the same, and lead wire member connecting the same with the outside of the sensor, the present invention is characterized in that the piezoelectric conversion portion and a portion of the lead wire member are integrally covered with polyamide resin and it is thereby formed into a case member. The present invention with the above described arrangement makes most of the characteristics of the polyamide resin having a strong crystalline polymer structure, whereby the frequency response characteristic of the vibration sensor is improved against thermal stress.

3 Claims, 3 Drawing Sheets

10a VIBRATION SENSOR
12
11b
16
15
14
17a
17
18 LEAD WIRES
17
11  17a  11a
13 PIEZOELECTRIC ELEMENT
19a COVERING RESIN

POLYAMIDE RESIN WITH 30% OF GLASS FIBERS

10 VIBRATION SENSOR
13 PIEZOELECTRIC ELEMENT
18 LEAD WIRES
19 COVERING RESIN

POLYURETHANE RESIN

VIBRATION SENSOR

BACKGROUND OF THE INVENTION

1. Field of the Invention

The present invention relates to an improvement of a vibration sensor for use in various technical fields.

2. Description of the Prior Art

Piezoelectric vibration sensors used for detecting vibration from various vibration sources are generally classified into two large types, resonant type and nonresonant type. In the former type, the resonant frequency of the sensor is set up to be virtually the same as the frequency of the object of measurement, and thus, the sensor is arranged to have a sensitivity characteristic such that it is highly sensitive only in a set frequency band. On the other hand, the latter type is arranged to have a flat sensitivity characteristic such that it is evenly sensitive over a wide range of frequency band.

As an introduction to an explanation of the present invention, the construction of a nonresonant vibration sensor utilizing a piezoelectric element will be described below. What is shown in FIG. 3 is a first example of a vibration sensor (knocking sensor) used for detecting vibration in an engine of an automobile. The vibration sensor 10 is constructed of a base member 11, in the form of a sleeve with a flange portion 11a provided at its lower part and a screw portion 11b formed at its upper part, a fixing hole 12 bored in the center of the base member 11 for fixing the sensor, for example, to an engine, a piezoelectric element 13, a mass member 14 about the periphery of the base member 11 a nut 16 for firmly holding the piezoelectric element 13 and the mass member 14 through a suitable washer 15, electrode portions 17 placed in contact with upper and lower sides of the piezoelectric element 13, respectively, insulating members 17a, and lead wires 18 connected to the electrode portions 17. A vibration sensor of the described structure is known as the structure of an accelerometer, and is described, for example, in U.S. Pat. No. 3,307,054.

The use of a resin 19 as a covering as shown in FIG. 3, is also known as a simple housing forming method. In the case of FIG. 3, the resin integrally covers the members 11 to 17 and a portion of the lead wires 18 and constitutes a case member. For example, a housing is provided by polyurethane resin 19.

SUMMARY OF THE INVENTION

From the princples of detection of vibration, it could easily be presumed that such a housing of a molded resin, as in FIG. 3, would have a large adverse effect on the sensor characteristics.

In the case of a nonresonat vibration sensor with which the present invention is concerned, solution of the equation of motion with a simplified model, such as a combination of a piezoelectric element and a mass member placed on the same gives an output voltage V of the sensor, which is put under a sinusoidal vibration, for example, at a range of frequencies sufficiently lower than the resonant frequency of the sensor, by $$V = \frac{A \cdot d_{33} \cdot m \cdot \omega^2}{S_{33}^E \cdot E_Y \cdot C} \sin(\omega t - \phi)$$

where

A: vibrational displacement of the object of measurement $\Omega$: angular velocity of the vibration $d_{33}$: piezoelectric constant of the piezoelectric element $E_Y$: Young's modulus of the piezoelectric element $S_{33}^E$: strain of the piezoelectric element C: electrostatic capacity of the sensor (inclusive of the piezoelectric element and wiring)

m: mass of the mass member t: time $\Omega$: the initial point for deriving the above equation, expressed as $$\phi = \tan^{-1} \frac{c\omega}{k - m \cdot \omega^2}$$

when k, representing the modulus of the spring, and c, representing the viscous damping coefficient in the equation of motion, with the simplified model are used.

The output voltage V is thus proportional to A and $\Omega^2$, or, in other words, it is proportional to the acceleration.

In the described case, the sensor characteristics are therefore dependent only on the characteristics of the piezoelectric element and the mass member.

In an actually constructed vibration sensor, however, such factors as a bias force, exerted when the mass member is placed on the piezoelectric element, or the spring factor of the components (such as a belleville spring) must be considered in addition to the above mentioned factors and thereby the sensor must be carefully designed.

Therefore, in putting the theory into practice, it is advantageous to add a minumum of other factors than those mentioned above that are absolutely necessary for assembling, installing or manufacturing a sensor.

Hence, in designing the sensor housing, it becomes important to consider not only the objective of protecting the piezoelectric conversion portion, composed of the piezoelectric element, the mass member, etc. from environmental effects, but also the arrangement of its structure so as not to adversely affect the piezoelectric conversion portion at all.

In this regard, there has been proposed a vibration sensor which does not use a covering resin. The vibration sensor 20 of this second prior art example is constructed as shown in FIG. 5, in which the structure of the sleeve-formed base member 11 and the nut 16 in the first example (FIG. 3) has been changed into a structure of an enclosed cylindrical box. More particularly, it has a structure of a cylindrical box made up of a base member 21 in the form of a cylindrical box including therein a post 21a in a sleeve form, a nut 26 with a flange 26a provided at its lower part, and a suitable packing material 26b interposed therebetween.

One the other hand, there has also been proposed a vibration sensor which uses a covering resin but designed so that the resin portion exercises no effect on the piezoelectric conversion portion. In the vibration sensor 30 of this third prior art example, such a design is employed as shown in FIG. 6 wherein a separating member 40 is interposed between the resin portion 39 composing the case body and the piezoelectric conversion portion 13, 14, and thereby both parts are isolated.

When the covering, made of a resin, as shown in the first example (FIG. 3) is put in direct contact with the piezoelectric element and the mass member, there arise various problems, such as:

① the housing exercises an effect as a mass load other than the load of the intrinsic mass member;

② the covering for the entire piezoelectric element causes deterioration in its transverse sensitivity;

③ the vibrational noise picked up by the lead wires is easily transmitted to the piezoelectric conversion portion through the housing;

④ the resonant characteristic of the housing is detected by the piezoelectric element;

⑤ mechanical characteristics of the resin (especially, its rigidity) are unstable with change in temperature; and ⑥ molding stress is exerted on the piezoelectric conversion portion, and since the housing has a larger coefficient of expansion that the material of the piezoelectric conversion portion, the stress exerted on the piezoelectric conversion portion varies with variations in temperature.

If use of such a vibration sensor is limited, for example, to detection, not measurement, of knocking out of various vibrations in an internal-combustion engine, and it is arranged to function as a knock sensor, strict designing for transverse sensitivity as with the sensor for measurement is not required therefor, and as the frequency band to be used, that exceeding 1 kHz or thereabout is considered sufficient, and hence, the effect of lead wires becomes small. Thus, for this limited use, if effects of the above mentioned factors excepting ② and ③ can be minimized or canceled with each other by some way or other, the design of the example 1 is considered to become practicable.

Conventionally, great importance has been attached to the structural advantages of the examples 1 to 3 such that the sensor can be installed at any position and lead wires or a connector can therefore be located at its side making the installation space small, and that the stress from fixing bolts can be prevented from affecting the piezoelectric conversion portion thanks to the structure of the base member in the sleeve form. Thus, as to the first example, no serious attention has been paid to the effect of the covering resin.

The present inventor investigated the effect of the materials of the covering resin on the sensor characteristics with regard to the factors ①, ④, ⑤, and ⑥ mentioned above.

An example using polyurethane as the material for the covering resin was mentioned above. Use of polyurethane was considered advantageous since the stress from the resin can be made smaller because it has a smaller coefficient of expansion and also is softer than other highly heat-resistant resins, and further, the resonance characteristic of the housing can be restrained because the resin is soft and therefore it has a good damping characteristic. That is, polyurethane was considered to exercise only little effect as to the factors ④ and ⑥. In fact, the frequency response curve at normal temperature was flat and hence there was no problem.

However, when the frequency response characteristic of the sensitivity at high temperature was measured, it was found that the sensitivity suddenly tended to lower as the freqncy exceeding a given value. The frequency where the lowering of the sensitivity started was gradually shifted to a lower frequency side with an increase in temperature. In FIG. 4 there is shown a frequency response curve of the vibration sensor 10 of FIG. 3 at normal temperature and a frequency response curve of the same at high temperature around 140° C. (The ordinate in the graph represents the output (mV) under a constant acceleration.)

The operating temperature of a knock sensor attached to an internal-combustion engine generally reaches its maximum at the point, as given in FIG. 4, and the knocking frequency of the internal-combustion engine of an automobile in general is present in the range from 5 to 10 kHz.

Hence, when a nonresonant vibration sensor is used as a knock sensor, a flat frequency response curve is required thereof under these two conditions (of temperature and frequency band).

Thus, it is apparent that the characteristic shown in FIG. 4 has a considerable significance in the practical use of the sensor.

Taking these circumstances into consideration, it is an object of the present invention to provide a vibration sensor having a simple housing using only a covering resin as described in the first example (FIG. 3) and yet capable of maintaining a flat frequency response characteristic, the same as that obtained at normal temperature, under operating conditions dealing with the frequency band and at high temperatures as mentioned above, and, when used for detection of knocking in an internal-combustion engine, capable of detecting the knocking vibration with high accuracy.

SUMMARY OF THE INVENTION

In order to achieve the above mentioned object, the present invention comprises a vibration sensor having a base member in the form of a sleeve for attachment to an object of measurement, a piezoelectric conversion portion put onto the periphery of the base member, and lead wires for connecting the piezoelectric element with an outside circuit, such that the piezoelectric conversion portion and a portion of the lead wires are integrally covered by polyamide resin formed into a case body.

The present invention with the described arrangement preferably uses a polyamide resin having a strong crystalline polymer structure, thereby improving the frequency response characteristic of the vibration sensor against thermal stress.

DESCRIPTION OF THE PREFERRED EMBODIMENTS

Figure 1:
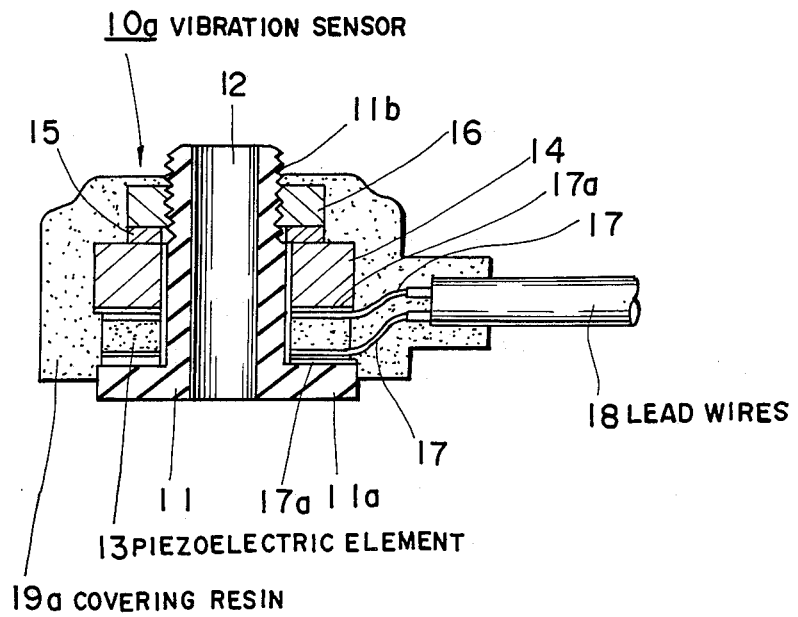
FIG. 1 is a sectional view showing the structure of a vibration sensor whose housing is made of polyamide resin according to the present invention.

Below will be given detailed description of the present invention with reference to illustrated embodiments.

In manufacturing vibration sensors for detecting knocking in an automobile engine, for example, a substance with excellent heat resistance is first selected as the material for the covering resin, constituting the case body, so that the sensor can be used at high temperature (around 130° to 150° C.). Further, in molding the case member, inclusive of the cables when cables are attached to the vibration sensor, the bonding property of the resin to the cable material must also be considered in the selection. Hence, the above described polyurethane resin, for example, has been used as a material meeting these requirements. However, when polyurethane resin is used for the housing, it is difficult to maintain a flat sensitivity-frequency characteristic (frequency response curve) at high temperature. At first, the polyurethane was considered advantageous in view of 4 and 6 of the above described six factors, but in connection with the factors 1 and 5, it has not proved to be satisfactory since it brings about deterioration in sensitivity in the domain exceeding a particular frequency point at high temperature. The following points can be regarded as the main causes of the deterioration.

Polyurethane is soft and has a good damping characteristic and this means that components of vibration at high frequencies are damped. In the present example of structure in which the housing acts as a mess load on the piezoelectric conversion portion as stated in the factor 1, the housing functioning as the mass load at a low frequency becomes unable to follow the vibration as the mass load in a domain of high frequencies, thereby contributing to deterioration in the sensitivity. At normal temperature, the critical frequency is higher than the bandwidth required of a knock sensor. But, as the temperature rises accompanied by further softening of the resin, the frequency domain in which the housing remains a vibrational load is shifted toward the lower frequency side. Further, polyurethane does not bond well with metallic or ceramic materials, and besides, while it exerts sufficient force against such a material at normal temperature because of its molding shrinkage, the pressure is relaxed when it is expanded at high temperature, and thereby it becomes unable to remain a vibrational load.

As a consequence of the foregoing, the sensitivity is lowered on the higher frequency side at high temperature.

In the present invention, after investigation of resin materials, polyamide resin was selected as the material highly heat-resistant and capable, even at its upper limit of operating temperatures, of maintaining mechanical characteristics exhibited at normal temperature and keeping a good bond to the piezoelectric conversion portion. By mixing glass fibers in with the polyamide resin, its heat resistance can be enhanced and its rigidity and coenefficient of expansion can be changed.

Polyamide resin is a resin having a strong crystalline polymer structure. It is known as a material being high in both strength, is elongation and excellent in elasticity and extremely resistant to bending, friction, or the like. It is a material used for various applications, not only as the fiber but also for covering material for electric wires or as substitutes for metallic materials for such as gearwheels and bearings. It is generally known as Nylon (Tradename of duPont) and the use of it for the housing material according to this invention is fit for its rightful purpose.

Figure 3:
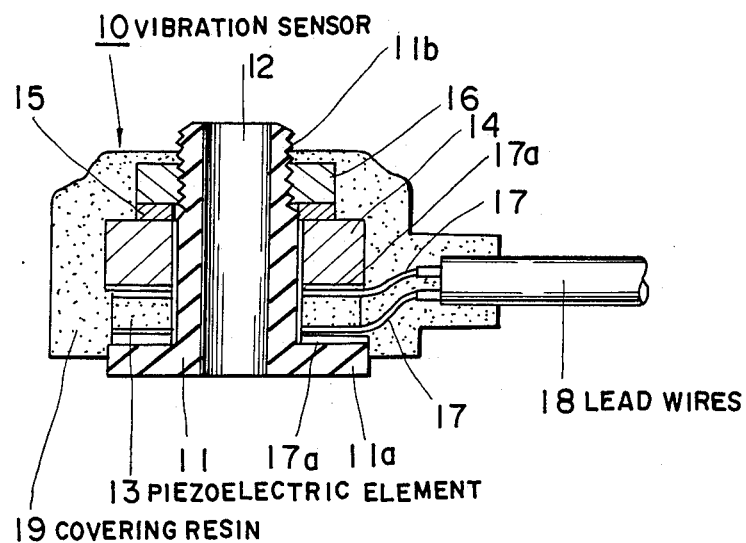
FIG. 3 is a sectional view showing the structure of a first example of a prior art vibration sensor which is structurally equivalent to that in FIG. 1 but having a housing made of polyurethane resin.
Figure 4:
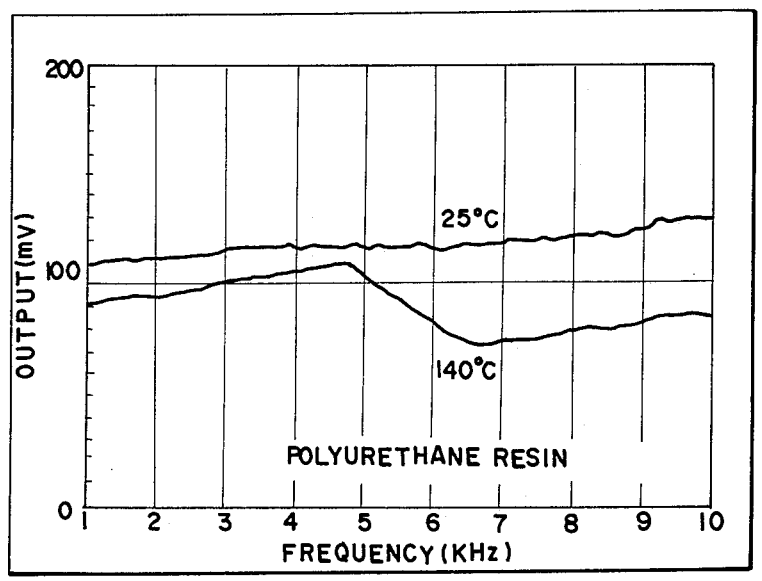
FIG. 4 is a sensitivity-frequency characteristic curve of the vibration sensor of FIG. 3.
Figure 5:
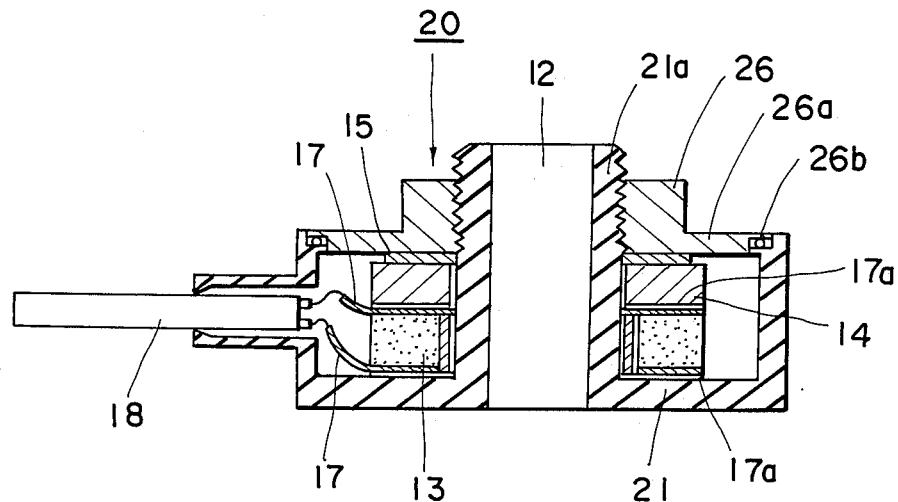
FIG. 5 is a sectional view showing the structure of a second example of a prior art vibration sensor.
Figure 6:
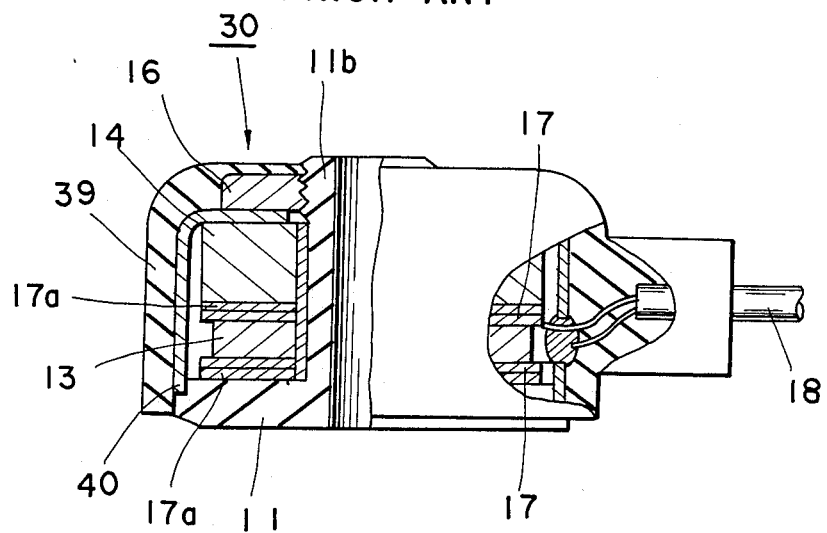
FIG. 6 is a sectional view showing the structure of a third example of a prior art vibration sensor.

The structure of the vibration sensor of the present invention is shown in FIG. 1. Although detailed description thereof is omitted here because it is of the same structure as that shown in FIG. 3, except for the material used for the covering, this vibration sensor 10a is structured of a sleeve-formed base member 11 with a fixing hole 12 made therein, a piezoelectric conversion portion composed of a piezoelectric element 13 and a mass member 14, a nut 16 tightening the piezoelectric conversion portion 13, 14 through a suitable washer 15, lead wires 18 connected with the electrode portions 17 in contact with the upper side and the under side of the piezoelectric element 13, and a covering resin 19a of polyamide covering the members 11 to 17 and a portion of the lead wires 18 and constituting the case body.

Figure 2:
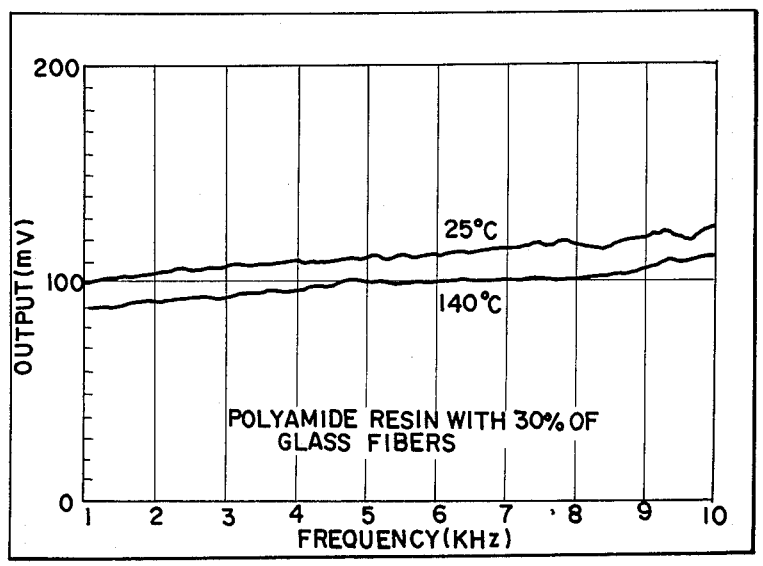
FIG. 2 is a sensitivity-frequency characteristic curve of the vibration sensor of FIG. 1.

In the present embodiment, Nylon (Tradename of duPont) with 30% of glass fibers mixed therein is used as the polyamide resin 19a for the covering resin. FIG. 2 shows a frequency response curve of the vibration sensor using this material.

The purpose of using the glass fibers mixed in the resin is, based on the investigation carried out as mentioned above, to raise the rigidity and lower the coefficient of expansion to some degree and to provide heat resistance against a temperature exceeding 150° C.

As clearly seen from FIG. 2, the vibration sensor of the described arrangement provides a flat frequency response characteristic throughout the domain from low vibration frequency to high vibration frequency despite changes in environmental temperatures.

It is apparent from the above description that the covering resin originally designed to be a housing acts as the factor influencing the main function of the vibration sensor. The present invention is aimed at reducing or offsetting such influence by selecting the right material for the covering resin thereby making it possible to maintain the good performance of a vibration sensor (a knock sensor in the present example).

As clearly understood from the above description, the present invention makes the most of the polyamide resin having a strong crystalline polymer structure, and hence, its compostion need not be more particularly defined. It may be suitably determined at the stage of planning and designing of the sensor considering such factors as range of variations of ambient temperature, the domain of frequencies to be detected and purpose and use of the detection.

Although a preferred embodiment has been described above, it is to be understood that the invention is not limited to it but various modifications may be possible without departing from the spirit and scope of the invention. For instance, while the illustrated embodiment has used the resin with glass fibers mixed therein, it may be such that uses the resin only or the resin mixed with other material.

What is claimed is:

1. A nonresonant knocking sensor comprising:
   a ceramic piezoelectric element having electrodes and a mass member, whereby forming a seismic system;
   a base member shaped in the form of a sleeve with a structure for installation on an object the knocking of which is to be measured;
   means for mounting said piezoelectric element and said mass member onto the periphery of said base member;
   means for tightening said piezoelectric element and said mass member to said base member;
   lead wires connected to said electrodes extending away therefrom; and polyamide resin casing integrally encasing said piezoelectric element, said mass member, said tightening means and a portion of the lead wires.

2. A vibration sensor according to claim 1, wherein said case member comprises polyamide resin with glass fibers mixed therewith.

3. A vibration sensor according to claim 2, wherein the content of the glass fibers is 30%.

* * * * *